UNITED STATES PATENT OFFICE.

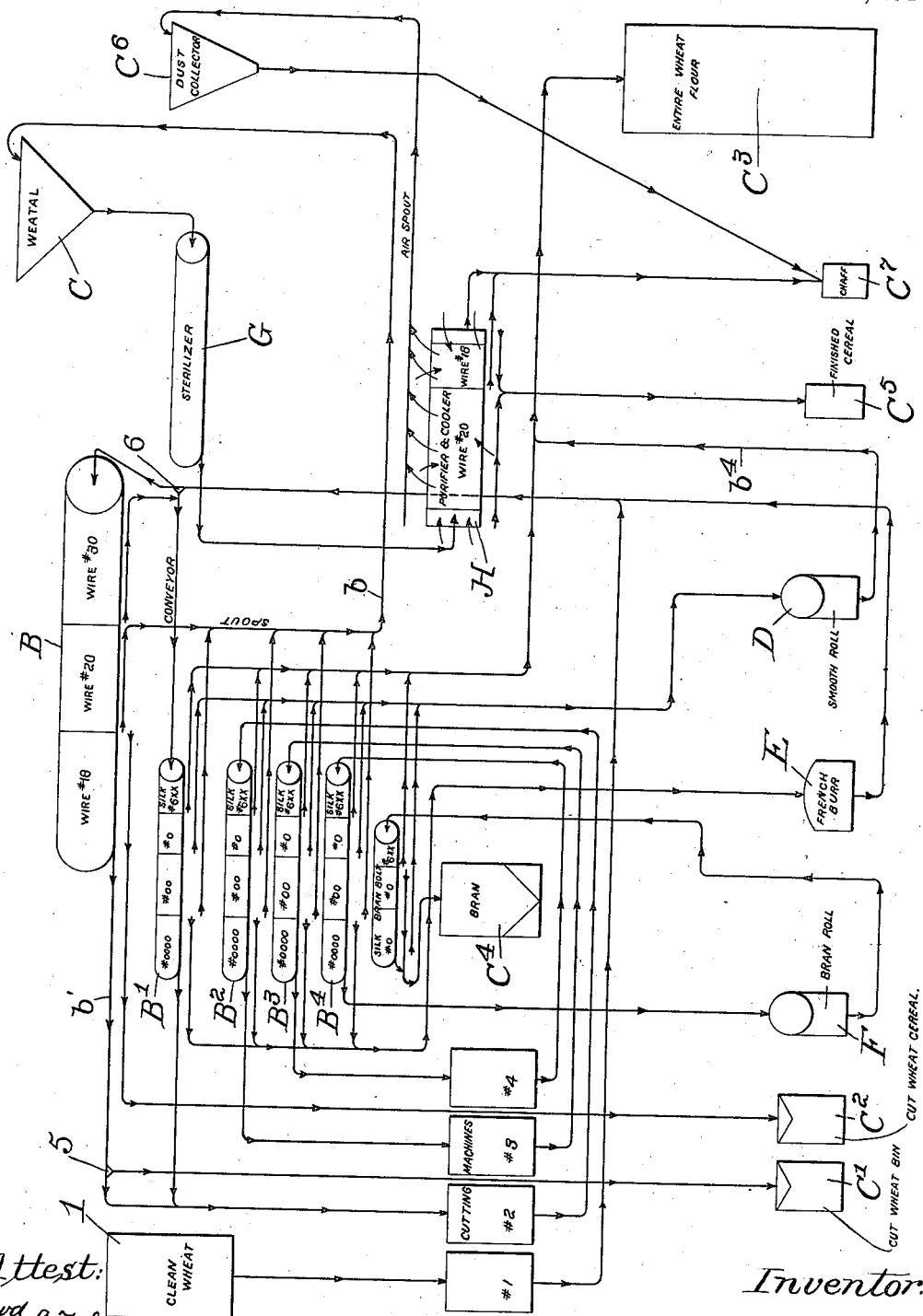

EZEKIEL B. COX, OF NEWTOWN, PENNSYLVANIA, ASSIGNOR TO NEWTOWN CUT WHEAT CEREAL AND TRADING-COMPANY, A CORPORATION OF PENNSYLVANIA.

FOOD CEREAL AND PROCESS OF MAKING THE SAME.

1,130,575.          Specification of Letters Patent.      Patented Mar. 2, 1915.

Application filed September 25, 1913. Serial No. 791,812.

*To all whom it may concern:*

Be it known that I, EZEKIEL B. COX, a citizen of the United States, residing at Newtown, Pennsylvania, have invented certain new and useful Improvements in Food Cereals and Processes of Making the Same, of which the following is a specification.

My invention consists of a whole wheat cereal composed of wheat berries finely divided with particles of the husk or bran attached to the particles of the whole wheat substance or meat. These bran or husk particles, according to my invention, maintain their natural attachment to the whole wheat substance or meat, the finely divided product being made without detaching the bran or husk from the berry.

The invention also consists in the process for producing the described whole wheat cereal.

In carrying out my invention I employ certain mechanical means but the particular structure of said means forms no part of my present invention, and I have therefore indicated an apparatus diagrammatically in the accompanying drawings.

My invention involves also the process by which I obtain certain by-products consisting of whole wheat flour and Graham flour, as will be explained hereinafter.

In the drawing 1 represents a bin from which the supply of clean wheat is drawn to carry out my process. From this bin the wheat is delivered into the first one of a series of cutting machines A. Each of these cutting machines is designed to cut or slice the wheat berries or portions of wheat berries, they being of like construction but graded as to the fineness of their cutting action on the grain, the one at the left being adapted to cut each grain in half and transversely while the next cutting machine at the right is adapted to receive sections of the berries of the size into which they are cut by the first machine and to divide these sections again, and each cutter toward the right therefor is adapted to cut the granules to a finer state than the preceding cutter.

The particular form of the cutting machines forms no part of my present invention, but I would state that the cutter employed may be of the general character of that disclosed in Letters Patent of Pryor 279,594, June 19, 1883, employing knives for slicing the grain, as distinguished from an apparatus for reducing the grain by abrading or grinding.

The first cutting machine severs the grain transversely into two pieces and this cut grain is then passed from the cutting machine to a bolting cylinder, for instance as shown at B. The lines having the arrow heads thereon indicate the passage of material through the apparatus. In passing through the bolting reel B any of the granules which may have been sliced or cut, to the proper degree of fineness for the final cereal product with bran attached, are separated from the mass and are conducted by a conveyer, indicated at $b$, to a receptacle for the final product or cereal indicated at C. The granules which are too large to pass through the screen cloth of this bolt B are passed to the second cutting machine by conveyer $b'$. Any granules which are small enough to pass through the bolting section marked wire #18, may be passed to a bin $C^2$ for "cut wheat," *i. e.* the product consisting of the sliced wheat having the bran attached, this product being of larger grain than that which it is desired to recover as the finished cereal, or what I term "weatal" and which is conveyed to the hopper C, as above described, from the finer screen section of the bolt B and from other bolts as will be described.

The granules which pass from the end of the bolting reel B instead of being led to the second cutting machine, *i. e.* # 2, may be deflected by a suitable gate at 5 to go to a "cut wheat" bin C' for use as a coarse cereal, coarser than that delivered to the bin $C^2$ but like the latter product having the bran particles maintained thereon by their natural attachment. From cutting machine #2 which makes a finer slicing of the wheat, with its bran attached, than the cutting machine #1, the material goes to another bolt B' or the material from the first cutting machine may be led to the bolt B' by adjusting a gate at 6. From the third section mark #00 of bolt B' the cereal of proper fineness for the final product also goes to the hopper C by the conveyer $b$. Any flour which is delivered through the screen cloth of the bolt B' is passed by the conveyer $b^2$ to the bin $C^3$ for "entire wheat flour." It will be understood that the bolting reel B' is composed of sections having screen cloth of different degrees of fineness to permit the different materials to pass through. Any coarse flour which passes through the section of bolt B' marked #0 passes along conveyer $b^3$ to the smooth rolls at D is reduced here and delivered as fine flour by conveyer or spout $b^4$ to the entire wheat bin $C^3$. Any bran which may have become detached from the particles of cereal and passes through the last section #0000 of this bolting reel B', is delivered to the French bur E where this material is reduced for subsequent use in making Graham flour. The material from the French bur is led back to the bolting reel B so as to recover any granules with bran attached suitable for the final cereal product.

Any cereal granules with bran attached which passes through bolt B' and is delivered from the end thereof, passes back to cutting machine #2 and from here is delivered to bolt $B^2$ and any granules which pass entirely through bolt $B^2$ and are delivered from the end thereof pass to the cutting machine #3 and are delivered from here, after being further sliced or reduced, to the bolt $B^3$ and this same action may be carried out by passing the granules through successive cutting machines and bolts securing a finer reduction each time, and each bolting action separating out from the mass of material those granules of proper fineness for the final cereal product for delivery into the hopper C. For this purpose each of the bolting reels delivers into a conveyer connected with the conveyer $b$ leading to the hopper C. I have shown five such bolts, B, B', $B^2$, $B^3$, $B^4$, but any desired number may be used. Each of the bolts B' to $B^4$ is connected to the conveyer $b^2$ to convey entire wheat flour to the "entire wheat flour" bin. Any bran screened through the last section of each of the bolts B' to $B^4$ is delivered to the French bur E to be passed back through the system with any large granules for treatment again. The residue from the bolt $B^4$, that is the material discharged from the end of this bolt, is passed to bran roll F where it is reduced and sent to the "bran bolt," so marked in the drawing, and here the flour of different grades is separated, the finer flour being passed immediately to the entire wheat bin and the coarser flour being passed to the smooth roll D to be reduced and sent to the entire wheat bin $C^3$. The bran from the bran bolt is passed to the bin $C^4$ and this bran may be mixed with the entire wheat flour in any suitable manner for forming Graham flour.

It will be seen that by my treatment the grain is reduced to a finely divided state, the berries being cut, not mashed, and by such cutting the small granules have the same proportion of bran which the grain contains before cutting. Further the proportions of bran and flour separated from the cereal are the same as exist in the whole grain.

By my finely divided cereal composed of the wheat meat granules and the bran maintaining its natural attachment to the granules, I provide a food cereal containing all the natural and wholesome qualities and in which the constituents will be in proper proportion and also one having certain physical advantages, for it will be noticed that although the granules will be only of the size, say, of coarse sand the bran will remain distributed in proper proportion throughout the mass because of its attachment to the granules, and this proper distribution will be maintained in handling or transporting the product or in cooking it. In other words there will be no stratifying of the mass by the collection of bran in one layer and the wheat meat at another.

From the "weatal" hopper C the finely divided cereal is passed to a sterilizer G which may be of any suitable construction, where the granules with bran attached is subjected to a heat of about 300° Fahrenheit. This machine has a horizontal cylinder which revolves and exposes the cereal to the above heat until all moisture is extracted and the cereal is browned enough to give it a nutty flavor. All trace of animal life is destroyed. After sterilizing is completed the cereal which becomes highly heated is cooled at once to prevent further roasting. This is done by passing the stock through a purifier H which contains a shaking screen. A strong air draft is drawn through the purifier by a suction fan operated from above, which draws the air up through the screen and cereal as it is sifted, thus cooling it completely. At the same time all light and fluffy materials are drawn off, leaving the cereal in a perfectly clean and finished condition. This goes to the bin $C^5$ and is the commercial cereal article. The dust goes to the collector $C^6$ and the chaff to the bin $C^7$.

The sterilizing and purifying steps of my process described above do not detach the bran from the wheat granules, the roasting and purifying actions taking place both upon the attached bran and the wheat granules.

I claim as my invention:

1. A food cereal consisting of wheat berries sliced or cut into a finely divided state with bran particles maintained on the wheat granules by natural attachment, said cereal being freed from flour, substantially as described.

2. A food cereal consisting of wheat berries sliced or cut into a finely divided state with bran particles maintained on the wheat granules by natural attachment, said granules with the attached bran being roasted, and thereby rendered ready for subsequent cooking, substantially as described.

3. A food cereal consisting of wheat berries sliced or cut transversely with the bran naturally attached to the sliced granules.

4. A food cereal consisting of a mass of wheat berries finely divided by slicing or cutting and freed from flour, said mass having bran evenly distributed throughout the same and naturally attached to the sliced wheat granules, substantially as described.

5. The herein described process consisting in slicing wheat berries and their attached husks to form granules with naturally attached bran, screening off the flour and bran that becomes detached, and roasting the wheat granules together with the bran maintained thereon by natural attachment, to render the material ready for cooking, substantially as described.

6. The herein described process consisting in slicing wheat berries and their attached husks to form granules with naturally attached bran screening therefrom the flour and bran that becomes detached, and screening off also the smaller granules with husk particles attached, then cutting or slicing the larger granules again and again screening off the flour, then mixing the granules of the different cutting actions and sterilizing said mixed granules with their attached husk particles.

In testimony whereof, I affix my signature in presence of two witnesses.

EZEKIEL B. COX.

Witnesses:
A. E. GIRTON,
ROLAND TOMLINSON.